United States Patent Office 3,474,174
Patented Oct. 21, 1969

3,474,174
PHARMACEUTICAL COMPOSITIONS AND METHODS UTILIZING BICYCLO[2.2.2]OC-TANE-1-AMINES AND BICYCLO[2.2.2]OC-TANE-1-METHYLAMINES
James C. Kauer, Wilmington, Del., assignor to E. I. du Pont de Nemours and Company, Wilmington, Del., a corporation of Delaware
No Drawing. Continuation-in-part of application Ser. No. 529,935, Feb. 25, 1966. This application July 17, 1968, Ser. No. 745,386
Int. Cl. A61k 27/00
U.S. Cl. 424—325
36 Claims

ABSTRACT OF THE DISCLOSURE

This invention relates to pharmaceutical compositions containing a compound of class of bicyclo[2.2.2]octane-1-amines and bicyclo[2.2.2]octane-1-methylamines and to the use of such compounds to control viral infections in warm-blooded animals. Typical compounds useful in these compositions and methods are 4-methylbicyclo-[2.2.2]octane-1-amine, α,4-dimethylbicyclo[2.2.2]octane-1-methylamine, α,α,4 - trimethylbicyclo[2.2.2]octane-1-methylamine, N, 4-dimethylbicyclo[2.2.2]octane-1-amine and the hydrochloride salts of these compounds.

RELATED APPLICATIONS

This application is a continuation-in-part of my application Ser. No. 529,935, filed Feb. 25, 1966 (now abandoned), which is a continuation-in-part of my application Ser. No. 375,337, filed June 15, 1964 (now abandoned), which in turn is a continuation-in-part of my application Ser. No. 277,141, filed May 1, 1963 (now abandoned).

SUMMARY OF THE INVENTION

In summary, this invention is directed to a pharmaceutical composition for controlling influenza virus infection in warm-blooded animals comprising a pharmaceutical carrier and an effective amount of a compound of the formula:

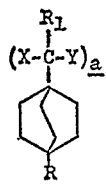

(I)

wherein R is hydrogen, methyl, ethyl, propyl, isopropyl or tert-butyl; X and Y are the same or different and are hydrogen, methyl or ethyl; $a$ is 0 or 1; when R is hydrogen, propyl, isopropyl or tert-butyl and $a$ is 0, $R_1$ is amino, methylamino or allylamino; when R is propyl, isopropyl or tert-butyl and $a$ is 1, $R_1$ is amino; when R is hydrogen and $a$ is 1, and when R is methyl or ethyl and $a$ is 0 or 1, $R_1$ is —$NR_2R_3$ wherein $R_2$ and $R_3$ are the same or different and are hydrogen, methyl, ethyl or allyl; and pharmaceutically acceptable acid-addition salts of said compounds.

This invention is also directed to a method of controlling an influenza virus infection in a warm-blooded animal comprising administering to said animal an effective amount of a compound of Formula I.

It will be understood that the use, in the above-described compositions and methods, of a compound hydrolyzable in vivo to a compound of Formula I is contemplated as being with the scope of this invention since for most purposes the two will be equivalent. It will also be understood that "pharmaceutically acceptable acid-addition salts" refers to acid-addition salts having a non-toxic anion. Representative of such salts are hydrochlorides, hydrobromides, sulfates, phosphates, nitrates, acetates, succinates, adipates, propionates, tartrates, citrates, bicarbonates, pamoates, cyclohexylsulfamates and acetylsalicylates. Of these, the hydrochlorides, acetates and cyclohexylsulfamates are preferred. The cyclohexylsulfamates have a pleasant taste and are therefore particularly useful in preparing syrups and uncoated tablets for oral administration.

DETAILED DESCRIPTION OF THE INVENTION

This invention is founded on the discovery that compounds of Formula I are useful as antiviral agents. These compounds possess the ability to inhibit and deter the incidence and growth of harmful viruses. For example, activity in tissue culture tests has been observed against influenza A (strains WSN and swine) and influenza A–2 (strains Michigan A/AA, JPC and Jap 305). In vivo tests in mice have indicated activity against such influenza virus strains as swine, Michigan A/AA and JPC as well as herpes and Semlike forest. Therapeutic as well as prophylactic activity has been noted.

Compounds of the above Formula I are preferred where R is methyl or ethyl. A broad range of antiviral activity is noted for this class of compounds.

α-Methyl and α,α-dimethyl-4-alkylbicyclo[2.2.2]octane-1-methylamines are particularly outstanding for their combination of antiviral activity and other properties.

Unsubstituted amino compounds are preferred by comparison with most of the N-substituted derivatives.

Particularly preferred are the hydrochlorides of the following compounds:

N,N,4-trimethylbicyclo[2.2.2]octane-1-amine
N,4-dimethylbicyclo[2.2.2]octane-1-amine
4-methylbicyclo[2.2.2]octane-1-amine
N-ethyl-4-methylbicyclo[2.2.2]octane-1-amine
4-ethylbicyclo[2.2.2]octane-1-amine
4-ethyl-N-methylbicyclo[2.2.2]octane-1-amine
α-Methylbicyclo[2.2.2]octane-1-methylamine
α,α-Dimethylbicyclo[2.2.2]octane-1-methylamine
α,N,4-trimethylbicyclo[2.2.2]octane-1-methylamine
α,N,N,4-tetramethylbicyclo[2.2.2]octane-1-methylamine
α,α,N-trimethylbicyclo[2.2.2]octane-1-methylamine
α,N-dimethylbicyclo[2.2.2]octane-1-methylamine
4-methylbicyclo[2.2.2]octane-1-methylamine
α,4-dimethylbicyclo[2.2.2]octane-1-methylamine
α,α,4-trimethylbicyclo[2.2.2]octane-1-methylamine
4-ethyl-α-methylbicyclo[2.2.2]octane-1-methylamine
4-ethyl-α,α-dimethylbicyclo[2.2.2]octane-1-methylamine.

Representative of other compounds employed in the methods and compositions of this invention are the following, as well as the non-toxic salts of the following compounds:

Bicyclo[2.2.2]octane-1-amine
4-propylbicyclo[2.2.2]octane-1-amine
4-tert-butylbicyclo[2.2.2]octane-1-amine
N-methyl-4-isopropylbicyclo[2.2.2]octane-1-amine
N-allyl-4-isopropylbicyclo[2.2.2]octane-1-amine
4-tert-butylbicyclo[2.2.2]octane-1-methylamine
4-propylbicyclo[2.2.2]octane-1-methylamine
N-methylbicyclo[2.2.2]octane-1-methylamine
N-allylbicyclo[2.2.2]octane-1-methylamine
N-allyl-4,N-dimethylbicyclo[2.2.2]octane-1-amine
N,N-diallyl-4-ethylbicyclo[2.2.2]octane-1-amine
N-ethyl-N,α,4-trimethylbicyclo[2.2.2]octane-1-methylamine
N,N-diethylbicyclo[2.2.2]octane-1-methylamine
N-allyl-4,α-dimethylbicyclo[2.2.2]octane-1-amine α-Ethyl-4-methylbicyclo[2.2.2]octane-1-methylamine
α,4-dimethyl-4-ethylbicyclo[2.2.2]octane-1-methylamine
N,4-dimethyl-α-ethylbicyclo[2.2.2]octane-1-methylamine
N-allyl-α-ethyl-4-methylbicyclo[2.2.2]octane-1-methylamine.

A detailed description of the methods by which compounds of Formula I can be prepared as well as working examples illustrating these methods are provided in the above-mentioned application Ser. No. 529,935 and said description and examples and all other disclosures of said application Ser. No. 529,935, not expressly set forth herein are hereby incorporated by reference for a more complete understanding of the invention.

The compounds of Formula I can be administered in the antiviral treatment according to this invention by any means that effects contact of the active ingredient compound with the site of virus infection in the body. It will be understood that this includes the site prior to infection setting in as well as after. For example, administration can be parenterally, that is subcutaneously, intravenously, intramuscularly or intraperitoneally. Alternatively or concurrently, the compounds are effective on administration by the oral route. Since they are particularly effective against respiratory infections such as viral influenza and viral pneumonia, administration can be by vapor or spray through the mouth or nasal passages. The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 0.1 to 25 milligrams per kilogram of body weight, although lower, such as 0.05 milligram per kilogram, or higher amounts can be used. Ordinarily, from 0.25 to 15 and preferably 0.5 to 10 milligrams, per kilogram per day, in one or more applications per day, is effective to obtain the desired result.

As specific examples of treatment, the compounds shown in Table I below were each administered intraperitoneally to Swiss-Webster mice one-half hour prior to infection with a 20LD$_{50}$ dose of influenza A virus. An LD$_{50}$ dose is that dose which causes the death of 50% of a group of non-treated mice within the test period; in these experiments the test period was twelve days. The mean survivor day (MSD) for each group of mice receiving the same test compound was calculated as follows:

$$MSD = \frac{\Sigma[f(d-1)]}{N}$$

where $f$ is the number of mice reported dead on day ($d$) and $N$ is the number of mice in the test group. From the MSD is calculated the AVI$_{50}$ (antiviral dose) which is the amount of test compound required to reduce the infection to a level equivalent to a reduction of one-half log of the virus inoculum. Stated differently, the AVI$_{50}$ is that dose, expressed in milligrams of test compound per kilogram of body weight, which causes an apparent 3.2-fold decrease in the infectivity of the virus.

TABLE 1

| Compound | Influenza Virus | AVI$_{50}$ (mg./kg.) |
|---|---|---|
| Bicyclo[2.2.2]octane-1-amine hydrochloride | A/Swine/S-15 | 14 |
| 4-methylbicyclo[2.2.2]octane-1-amine hydrochloride | do | 2.3 |
| 4-ethylbicyclo[2.2.2]octane-1-amine hydrochloride | do | 4.7 |
| 4-propylbicyclo[2.2.2]octane-1-amine hydrochloride | do | 9.8 |
| 4-isopropylbicyclo[2.2.2]octane-1-amine hydrochloride | do | 7.9 |
| 4-tert-butylbicyclo[2.2.2]octane-1-amine hydrochloride | do | 5.6 |
| N,4-dimethylbicyclo[2.2.2]octane-1-amine hydrochloride | do | 1.5 |
| N,N,4-trimethylbicyclo[2.2.2]octane-1-amine hydrochloride | do | 3.1 |
| Bicyclo[2.2.2]octane-1-methylamine hydrochloride | do | 4.1 |
| 4-methylbicyclo[2.2.2]octane-1-methylamine hydrochloride | do | 2.1 |
| N,4-dimethylbicyclo[2.2.2]octane-1-methylamine hydrochloride | do | 5.1 |
| N,N,4-trimethylbicyclo[2.2.2]octane-1-methylamine hydrochloride | do | 8.4 |
| 4-propylbicyclo[2.2.2]octane-1-methylamine hydrochloride | do | 23 |
| 4-tert-butylbicyclo[2.2.2]octane-1-methylamine hydrochloride | do | 8.3 |
| α-Methylbicyclo[2.2.2]octane-1-methylamine hydrochloride | do | 3.0 |
| α,4-dimethylbicyclo[2.2.2]octane-1-methylamine hydrochloride | do | 0.5 |
| α,α-Dimethylbicyclo[2.2.2]octane-1-methylamine hydrochloride | do | 2.2 |
| α,α,4-trimethylbicyclo[2.2.2]octane-1-methylamine hydrochloride | do | 1.3 |

The active ingredients of Formula I can be employed in useful compositions according to the present invention in such dosage forms as tablets, capsules, powder packets, or liquid solutions, suspensions or elixirs for oral administration, or liquid solutions for parenteral use, and in certain cases, suspensions for parenteral use (except intravenous). In such compositions the active ingredient will ordinarily always be present in an amount of at least 0.5% by weight based on the total weight of the composition and not more than 90% by weight. Besides the active ingredient of Formula I the antiviral composition will contain a solid or liquid non-toxic pharmaceutical carrier for the active ingredient.

In one embodiment of a pharmaceutical composition of this invention, the solid carrier is a capsule which can be the ordinary gelatin type. In the capsule will be from about 30 to 60% by weight of a compound of Formula I and 70 to 40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight of carrier and from about 95% to about 5% and preferably about 75% to about 10% by weight of active ingredient. These dosage forms preferably contain from about 5 to 500 milligrams of active ingredient, with from about 25 to about 250 being most preferred.

The pharmaceutical carrier can, as previously indicated, be a sterile liquid such as water and oils, including those of petroleum, animal, vegetable or synthetic origin, for example peanut oil, soybean oil, mineral oil, sesame oil and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.5% to 25% and preferably about 1% to 10% by weight of the active ingredient.

As mentioned above, oral administration can be in a suitable suspension or syrup, in which the active ingredient ordinarily will constitute from about 0.5 to 10%, and preferably about 0.2 to 5% by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain the present invention.

Example 1

A large number of unit capsules are prepared by filling standard two-piece hard gelatin capsules weighing about 50 milligrams each with 50 milligrams of powdered bicyclo[2.2.2]octane-1-amine, hydrochloride, 125 milligrams of lactose and 1 milligram of "Cab-O-sil."

Example 2

Example 1 is repeated except that soft gelatin capsules are used and the powdered bicyclo[2.2.2]octane-1-amine is first dissolved in mineral oil.

Example 3

Example 1 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

Example 4

A parenteral composition suitable for administration by injection is prepared by stirring 5% by weight of the active ingredient of Example 1 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

The compounds of Formula I are antiviral agents in domestic animals and livestock. As an illustration, the compounds of Formula I are effective against swine influenza and an embodiment of this invention, therefore, is the control of this infection by incorporating an active ingredient in the diet of the animal. For most purposes, an amount of active compound will be used to provide from about 0.0001% to 0.02%, by weight of the active compound based on the total weight of feed intake.

Thus, novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, N.Y., 1948, 21st edition. The selection of the particular feed is within the knowledge of the art and will depend of course on the animal, the economics, natural materials available, the surrounding circumstances and the nature of the effect desired, as will be readily understood.

Particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention:

Example 5

A feed for pigs is prepared as follows:

| | Pounds |
|---|---|
| Oat groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
| | 2051 |

There is added to the pigs' diet a concentrate of 50% of N-methylbicyclo[2.2.2]octane - 1 - amine hydrochloride as the active ingredient and 50% by weight corn flour, in an amount that provides 0.015% by weight of the active ingredients based on the total diet.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

What is claimed is:

1. A method of controlling an influenza virus infection in a warm-blooded animal comprising administering to said animal an effective amount of a compound of the formula

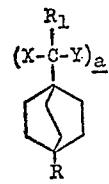

wherein R is hydrogen, methyl, ethyl, propyl, isopropyl, or tert-butyl; X and Y are the same or different and are hydrogen, methyl or ethyl; $a$ is 0 or 1; when R is hydrogen, propyl, isopropyl or tert-butyl and $a$ is 0, $R_1$ is amino, methylamino or allylamino; when R is propyl, isopropyl or tert-butyl and $a$ is 1, $R_1$ is amino; when R is hydrogen and $a$ is 1, and when R is methyl or ethyl and $a$ is 0 or 1, $R_1$ is —$NR_2R_3$ wherein $R_2$ and $R_3$ are the same or different and are hydrogen, methyl, ethyl or allyl; and pharmaceutically acceptable acid-addition salts of said compounds.

2. The method of claim 1 wherein said compound is N,N,4-trimethylbicyclo[2.2.2]octane - 1 - amine hydrochloride.

3. The method of claim 1 wherein said compound is N,4 - dimethylbicyclo[2.2.2]octane - 1 - amine hydrochloride.

4. The method of claim 1 wherein said compound is 4-methylbicyclo[2.2.2]octane-1-amine hydrochloride.

5. The method of claim 1 wherein said compound is N-ethyl-4-methylbicyclo[2.2.2]octane - 1 - amine hydrochloride.

6. The method of claim 1 wherein said compound is 4-ethylbicyclo[2.2.2]octane-1-amine hydrochloride.

7. The method of claim 1 wherein said compound is 4-ethyl-N-methylbicylo[2.2.2]octane - 1 - amine hydrochloride.

8. The method of claim 1 wherein said compound is α-methylbicyclo[2.2.2]octane - 1 - methylamine hydrochloride.

9. The method of claim 1 wherein said compound is α,α-dimethylbicyclo[2.2.2]octane - 1 - methylamine hydrochloride.

10. The method of claim 1 wherein said compound is α,N,4 - trimethylbicyclo[2.2.2]octane - 1 - methylamine hydrochloride.

11. The method of claim 1 wherein said compound is α,N,N,4 - tetramethylbicyclo[2.2.2]octane - 1 - methylamine hydrochloride.

12. The method of claim 1 wherein said compound is α,α,N-trimethylbicyclo[2.2.2]octane - 1 - methylamine hydrochloride.

13. The method of claim 1 wherein said compound is α,N - dimethylbicyclo[2.2.2]octane - 1- methylamine hydrochloride.

14. The method of claim 1 wherein said compound is 4-methylbicyclo[2.2.2]octane - 1 - methylamine hydrochloride.

15. The method of claim 1 wherein said compound is α,4-dimethylbicyclo[2.2.2]octane - 1 - methylamine hydrochloride.

16. The method of claim 1 wherein said compound is α,α,4-trimethylbicyclo[2.2.2]octane - 1 - methylamine hydrochloride.

17. The method of claim 1 wherein said compound is 4-ethyl-α-methylbicyclo[2.2.2]octane - 1 - methylamine hydrochloride.

18. The method of claim 1 wherein said compound is 4 - ethyl-α,α-dimethylbicyclo[2.2.2]octane - 1 - methylamine hydrochloride.

19. A pharmaceutical composition for controlling influenza virus infection in warm-blooded animals comprising a pharmaceutical carrier and an effective amount of a compound of the formula

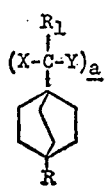

wherein R is hydrogen, methyl, ethyl, propyl, isopropyl or tert-butyl; X and Y are the same or different and are hydrogen, methyl or ethyl; $a$ is 0 or 1; when R is hydrogen, propyl, isopropyl or tert-butyl and $a$ is 0, $R_1$ is amino, methylamino or allylamino; when R is propyl, isopropyl or tert-butyl and $a$ is 1, $R_1$ is amino; when R is hydrogen and $a$ is 1, and when R is methyl or ethyl and $a$ is 0 or 1, $R_1$ is —$NR_2R_3$ wherein $R_2$ and $R_3$ are the same or different and are hydrogen, methyl, ethyl or allyl; and pharmaceutically acceptable acid-addition salts of said compounds.

20. The composition of claim 19 wherein said compound is N,N,4 - trimethylbicyclo[2.2.2]octane-1-amine hydrochloride.

21. The composition of claim 19 wherein said compound is N,4-dimethylbicyclo[2.2.2]octane - 1 - amine hydrochloride.

22. The composition of claim 19 wherein said compound is 4-methylbicyclo[2.2.2]octane-1-amine hydrochloride.

23. The composition of claim 19 wherein said compound is N-ethyl-4-methylbicyclo[2.2.2]octane-1-amine 24. The composition of claim 19 wherein said compound is 4-ethylbicyclo[2.2.2]octane - 1 - amine hydrochloride.

25. The composition of claim 19 wherein said compound is 4-ethyl-N-methylbicyclo[2.2.2]octane-1-amine hydrochloride.

26. The composition of claim 19 wherein said compound is α-methylbicyclo[2.2.2]octane - 1 - methylamine hydrochloride.

27. The composition of claim 19 wherein said compound is α,α-dimethylbicyclo[2.2.2]octane - 1 - methylamine hydrochloride.

28. The composition of claim 19 wherein said compound is α,N,4-trimethylbicyclo[2.2.2]octane - 1 - methylamine hydrochloride.

29. The composition of claim 19 wherein said compound is α,N,N,4 - tetramethylbicyclo[2.2.2]octane-1-methylamine hydrochloride.

30. The composition of claim 19 wherein said compound is α,α,N-trimethylbicyclo[2.2.2]octane - 1 - methylamine hydrochloride.

31. The composition of claim 19 wherein said compound is α,N-dimethylbicyclo[2.2.2]octane - 1 - methylamine hydrochloride.

32. The composition of claim 19 wherein said compound is 4-methylbicyclo[2.2.2]octane - 1 - methylamine hydrochloride.

33. The composition of claim 19 wherein said compound is α,4-dimethylbicyclo[2.2.2]octane - 1 - methylamine hydrochloride.

34. The composition of claim 19 wherein said compound is α,α,4 - trimethylbicyclo[2.2.2]octane-1-methylamine hydrochloride.

35. The composition of claim 19 wherein said compound is 4-ethyl-α-methylbicyclo[2.2.2]octane-1-methylamine hydrochloride.

36. The composition of claim 19 wherein said compound is 4-ethyl - α,α - dimethylbicyclo[2.2.2]octane-1-methylamine hydrochloride.

References Cited
UNITED STATES PATENTS 3,264,351  8/1966  Humber _____ 260—563

ALBERT T. MYERS, Primary Examiner

J. D. GOLDBERG, Assistant Examiner

PO-1050
(5/69)

UNITED STATES PATENT OFFICE
CERTIFICATE OF CORRECTION

Patent No. 3,474,174      Dated October 21, 1970

Inventor(s) James C. Kauer

It is certified that error appears in the above-identified patent and that said Letters Patent are hereby corrected as shown below:

In Column 8, lines 7 and 8, Claim 23 should be amended to appear as follows:

-- 23. The composition of Claim 19 wherein said compound is N-ethyl-4-methylbicyclo/2.2.2/octane-1-amine-hydrochloride. --

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents